(12) United States Patent
Rachlin et al.

(10) Patent No.: US 9,182,584 B2
(45) Date of Patent: Nov. 10, 2015

(54) METHOD AND SYSTEM FOR EVALUATING STARE-TIME BY A POINTING SYSTEM

(75) Inventors: Elliott Rachlin, Scottsdale, AZ (US); David J. Dopilka, Glendale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 786 days.

(21) Appl. No.: 13/563,469

(22) Filed: Jul. 31, 2012

(65) Prior Publication Data

US 2014/0039855 A1   Feb. 6, 2014

(51) Int. Cl.
*G06G 7/48* (2006.01)
*G02B 23/00* (2006.01)
*G01S 3/786* (2006.01)

(52) U.S. Cl.
CPC ............... *G02B 23/00* (2013.01); *G01S 3/7862* (2013.01); *G06G 7/48* (2013.01)

(58) Field of Classification Search
CPC .................................. G02B 23/00; G06G 7/48
USPC .......................................... 703/6; 250/203.6
See application file for complete search history.

(56) References Cited

U.S. PATENT DOCUMENTS

| | | | |
|---|---|---|---|
| 5,133,050 A * | 7/1992 | George et al. .................. 345/632 |
| 5,686,719 A * | 11/1997 | Elkin .......................... 250/203.1 |
| 5,760,739 A | 6/1998 | Pauli |
| 6,278,100 B1 | 8/2001 | Friedman et al. |
| 6,295,021 B1 | 9/2001 | Lichten et al. |
| 7,092,156 B2 | 8/2006 | Baun et al. |
| 7,105,791 B1 | 9/2006 | Poller |
| 7,201,308 B2 * | 4/2007 | Samo-Lipman ............... 235/375 |
| 7,349,804 B2 * | 3/2008 | Belenkii et al. ................ 701/500 |
| 7,513,460 B2 | 4/2009 | Cepollina et al. |
| 7,744,036 B2 | 6/2010 | Kawaguchi et al. |
| 7,769,475 B2 | 8/2010 | Fujimoto et al. |
| 7,806,369 B2 | 10/2010 | Kawaguchi |
| 7,982,951 B1 | 7/2011 | Innes et al. |
| 8,174,693 B1 | 5/2012 | Matthews |
| 8,189,956 B2 | 5/2012 | Johnson |
| 8,275,883 B2 * | 9/2012 | Snoddy et al. ................. 709/225 |
| 2002/0145105 A1 | 10/2002 | Rhoads |
| 2008/0017784 A1 | 1/2008 | Hoot et al. |
| 2011/0226907 A1 | 9/2011 | Robinson |

OTHER PUBLICATIONS

Bernacca et al., Star visibility and tracking from the Space Station, Dec. 1, 2010, Advances in Space Research, vol. 46, Issue 11, pp. 1354-1381.*
Muscettola et al., Coordinating space telescope operations in an integrated planning and scheduling architecture, 1992, IEEE Control Systems, vol. 12, Issue 1, pp. 28-37.*

(Continued)

*Primary Examiner* — Kamini S Shah
*Assistant Examiner* — Juan Ochoa
(74) *Attorney, Agent, or Firm* — Ingrassia Fisher & Lorenz, P.C.

(57) ABSTRACT

A method and system to evaluate stare-time of a selected target by a pointing system is provided. In an embodiment, the method includes specifying a time period for evaluation. A processor simulates movement of selected celestial bodies during the time period and movement of the platform during the time period. The processor further simulates pointing the pointing system in each celestial direction during the time period. The method calculates stare-time in each celestial direction uninterrupted by the selected celestial bodies and the platform during the time period.

20 Claims, 6 Drawing Sheets

(56) References Cited

OTHER PUBLICATIONS

Naletto and Poletto, Performance analysis of the spectroscopic channel of UVISS, the ultraviolet Italian telescope for the ISS, Feb. 26, 2003, Proc. SPIE 4854, Future EUV/UV and Visible Space Astrophysics Missions and Instrumentation, pp. 29-38.*
Long et al., Scheduling James Webb Space Telescope Observations at L2, 2006, SpaceOps Conference, American Institute of Aeronautics and Astronautics, pp. 1-14.*
Giuliano and Johnston, Evaluating Scheduling Strategies for JWST Momentum Management, 2009, Association for the Advancement of Artificial Intelligence, pp. 1-8.*
Wayne Kinzel, JWST planning and scheduling operations and concepts, Jul. 30, 2010, Proc. SPIE 7737, Observatory Operations: Strategies, Processes, and Systems III, pp. 1-12.*
Giuliano and Johnston, Multi-Objective Evolutionary Algorithms for Scheduling the JWST, 2008, ICAPS 2008, pp. 107-115.*
Giuliano et al., Towards a Heuristic for Scheduling the James Webb Space Telescope, 2007, Association for the Advancement of Artificial Intelligence, pp. 160-167.*
Choi, J. et al.: A Study on the Strategies of the Positioning of a Satellite on Observed Images by the Astronomical Telescope and the Observation and Initial Orbit Determination of Unidentified Space Objects, Journal of Astronomy and Space Sciences 28(4), 2011, pp. 333-344.
Kunz A. A.: A Virtual Environment for Satellite Modeling and Orbital Analysis in a Distributed Interactive Simulation, Thesis Presented to the Faculty of the Graduate School of Engineering of the Air Force Institute of Technology Air University, Dec. 1993.
Schmunk, M. M.: Initial Determination of Low Earth Orbits Using Commercial Telescopes, Thesis Presented to the Faculty Department of Aeronautics and Astronautics Graduate School of Engineering and Management Air Force Institute of Technology Air University Air Education and Training Command, Mar. 2008.
Abercromby, K. J. et al.: . Michigan Orbital DEbris Survey Telescope Observations of the Geosynchronous Orbital Debris Environment, National Aeronautics and Space Administration, NASA/TP-2011-217350, Sep. 2011.
Stoneking, E. T. et al.: Real-time Visualization of Spacecraft Telemetry for the GLAST and LRO Missions, American Institute of Aeronautics and Astronautics, 2010.
Albert, J.: Satellite-Mounted Light Sources as Photometric Calibration Standards for Ground-Based Telescopes, Astronomical Journal 143, 8, 2012.

* cited by examiner

METHOD AND SYSTEM FOR EVALUATING STARE-TIME BY A POINTING SYSTEM

TECHNICAL FIELD

Embodiments of the subject matter described herein relate generally to pointing systems. More particularly, embodiments of the subject matter relate to a method and system for evaluating stare-time of selected targets by a pointing system such as a telescope.

BACKGROUND

Hosting a pointing system, such as a telescope, on a body like an orbiting space station provides advantages and disadvantages. For example, it is convenient to have the telescope mounted in a relatively accessible location. On the other hand, shadowing effects from the structural elements of the mounting body can reduce the viewing capability of the telescope. Shadowing of the telescope can also occur due to celestial bodies such as the Sun, Earth and Moon.

Determining when and how much shadowing affects telescopes in potential or existing locations can be beneficial to image recording of selected targets. For example, determining the effects on shadowing on a telescope can be used to assess the viability of a proposed telescope with a proposed geometry at a proposed mounting location. Also, evaluating shadowing in multiple directions of interest can allow for scheduling image recording of those directions by the telescope to optimize "stare-time" of the telescope.

Assessing how much continuous "stare-time" is achievable by the pointing system in all directions of interest would allow for the creation of human-readable "sky charts." Such sky chart could illustrate, for a selected telescope configuration at a selected time period, how much and what areas of the celestial sky are uninterruptedly visible for various durations of stare-time. Further, such sky charts would be useful for evaluating potential telescope locations and configurations, and for optimizing use of existing telescopes at known locations.

Hence, there is a need for a method and system for evaluating stare-time by a pointing system. The method and system can be utilized to plan design and installation of a proposed pointing system, to optimize use of an existing pointing system, and to produce easily understood sky charts for evaluation of pointing systems. Other desirable features and characteristics of the method and system will become apparent from the subsequent detailed description and the appended claims, taken in conjunction with the accompanying drawings and the preceding background.

BRIEF SUMMARY

A method for evaluating performance of a pointing system mounted on a platform is provided. The method begins by specifying a time period for evaluation. The method simulates movement of selected celestial bodies and movement of the platform during the time period with a processor. Further, the method provides for simulating pointing the pointing system in each celestial direction during the time period with the processor. Stare-time in each celestial direction uninterrupted by the selected celestial bodies and the platform during the time period is calculated with the processor.

A method for evaluating stare-time of a selected target by a pointing system during a specified time period is also provided. In an exemplary embodiment, the method includes simulating movement of the pointing system and celestial bodies during the specified time period with a processor. The method further simulates pointing the pointing system at the selected target with the processor. Occultations between the pointing system and the selected target by the celestial bodies are identified with the processor. The method calculates uninterrupted stare-time of the selected target by the pointing system with the processor.

Also provided is a system for evaluating stare-time of a selected target by a pointing system during a specified time period. The system includes a module for simulating movement of the pointing system, the Moon, and the Earth during the specified time period. The system further includes a module for simulating pointing the pointing system at the selected target. Also, the system includes a module for identifying occultations between the pointing system and the selected target by the Sun, the Moon, or the Earth. A processor is provided for calculating uninterrupted stare-time of the selected target by the pointing system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures and wherein:

DETAILED DESCRIPTION

Figure 1:
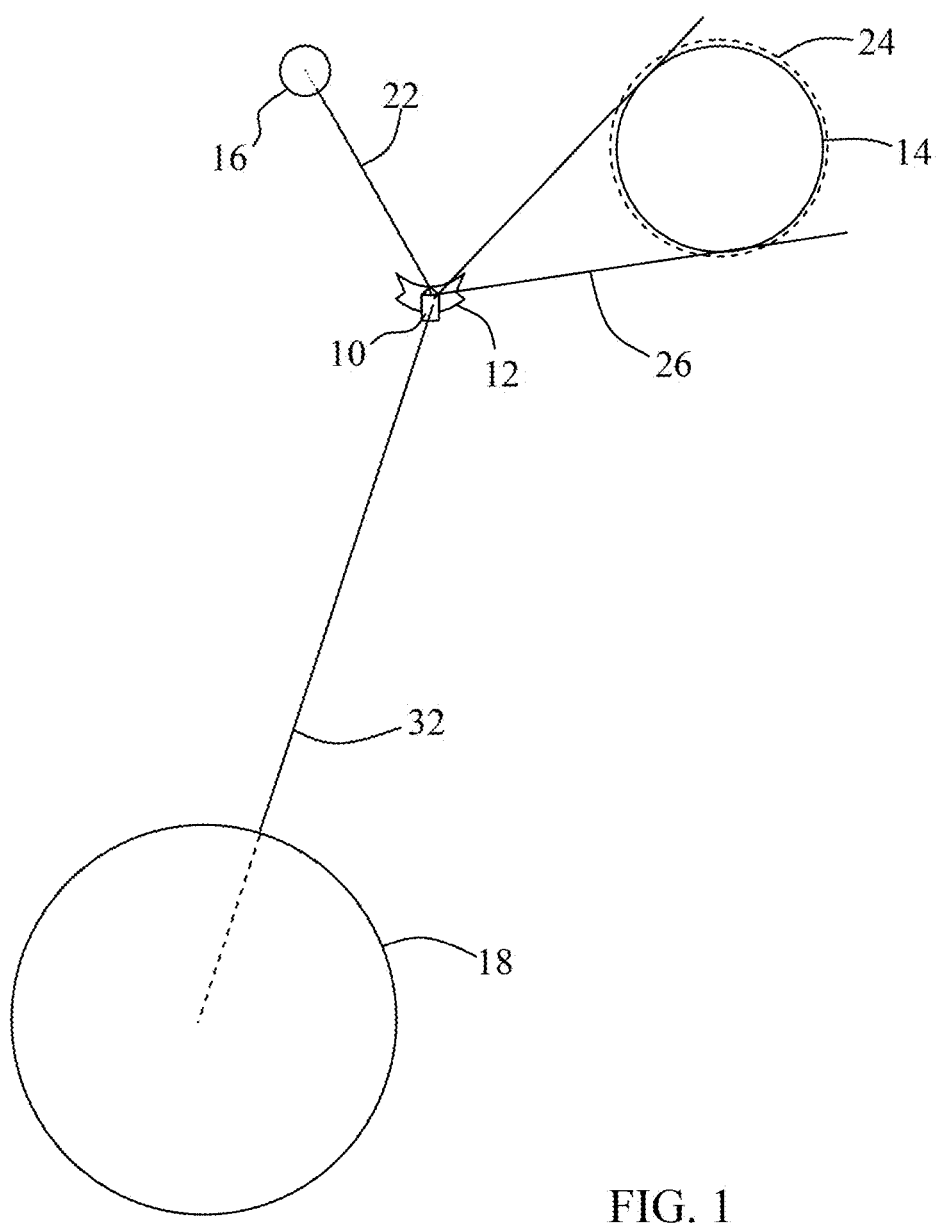
FIG. 1 is a not-to-scale schematic representation of a pointing system mounted on a platform for viewing the celestial sky.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, orbit modeling, pointing system pointing, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter described herein relates to the evaluation of stare-time of selected targets, such as celestial or terrestrial targets, by a pointing system such as a telescope. The evaluation of stare-time can be utilized as a tool for planning the location and geometry of a proposed pointing system, or as a tool for optimizing usage of a pointing system in capturing images of a plurality of selected targets.

FIG. 1 is a simplified illustration, not to scale, of a pointing system 10 mounted on a platform 12. In FIG. 1, the Moon 16 and the Sun 18 are also illustrated. While the platform 12 is shown in orbit around the Earth 14, it could orbit other celestial bodies or travel outside of an orbit. Therefore, the pointing system 10 can be used while orbiting any celestial body, or while on a non-orbiting path such as an escape trajectory or inter-solar system travel. While the Earth 14, Moon 16, and Sun 18 are addressed specifically, the method and system disclosed can evaluate stare-time in view of occultations by any celestial body.

As can be seen in FIG. 1, the Earth 14, Moon 16, and Sun 18 may block portions of the celestial sky from the pointing system 10 at any given time. The Earth 14, Moon 16, and Sun 18 are identified as examples of celestial bodies that can block portions of the celestial sky from the pointing system 10. Further, the method and system herein can be used to evaluate any celestial body, not limited to the Earth, Moon and Sun. As illustrated, the pointing system 10 is blocked from viewing the celestial sky behind the Moon 14 within a selected minimum angle, such as about 9 degrees of the vector 22, from the pointing system 10 to the center of the Moon 16. (Note that the specified angle may be larger than the actual angle required by the physical size of the Moon to provide for safety margin against inadvertent blinding of the telescope.) Likewise, the Earth 14, including the Earth's limb 24, blocks or impairs the view of the celestial sky behind the Earth 14 within a minimum selected angle, such as about 8 degrees, of any tangent line 26 from the pointing system 10 to the Earth 14 (again providing for a safety margin to avoid blinding).

The Sun 18, and light from the Sun 18, blocks the portion of the celestial sky within about a minimum angle, such as about 50 degrees, of the vector 32 from the pointing system 10 to the center of the Sun 18. Especially with the Sun, the specified angle may be larger than the actual angle required by the physical size of the Sun to provide for safety margin against inadvertent blinding of the telescope.

Figure 2:
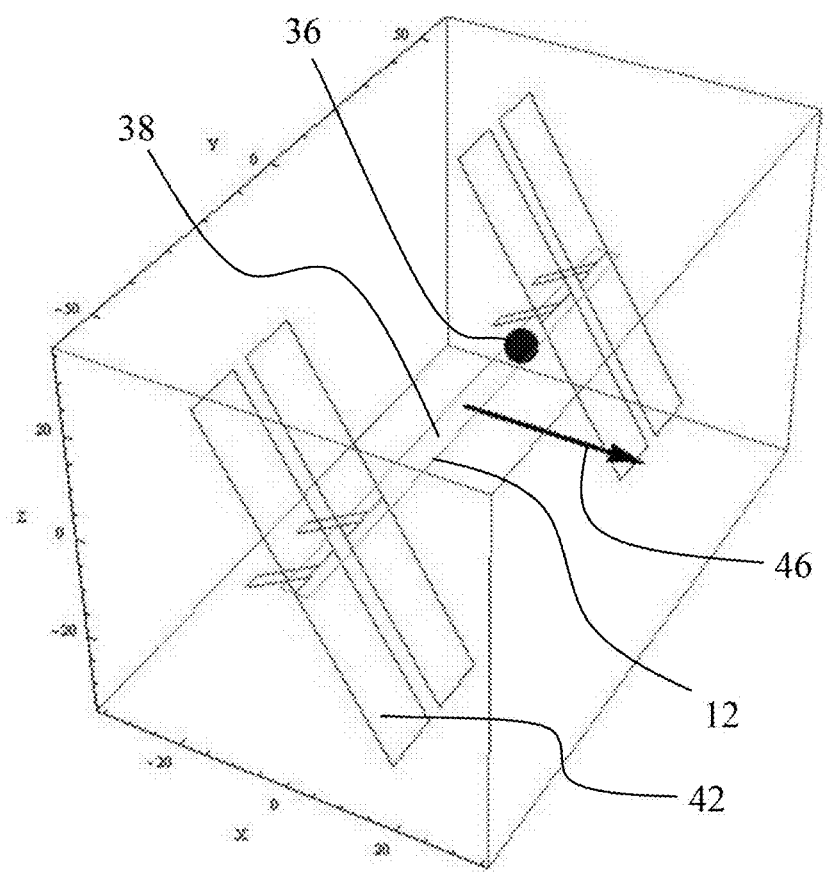
FIG. 2 is a schematic representation of the platform of FIG. 1.

Referring to FIG. 2, a platform 12 is shown with a location 36 for mounting a pointing system 10. An exemplary platform 12 includes the International Space Station or other satellites. As shown, the platform 12 includes stationary structural elements 38, such as the platform truss, and movable structural elements 42, such as the rotating solar array wings and solar array radiators. As is well-known, solar array components 42 are moved to track the Sun to collect solar energy. As with the celestial bodies 14, 16, and 18, the structural elements 38 and 42 also block portions of the celestial sky from the pointing system 10. The portions of the celestial sky blocked by the structural elements 38 and 42 depend on the rotation of the platform 12 about its x-axis (roll), y-axis (pitch), and z-axis (yaw). Further, as the platform 12 travels along its velocity vector 46, the portions of celestial sky blocked by the structural elements 38 and 42 (and by celestial bodies 14, 16 and 18) change.

Figure 3:
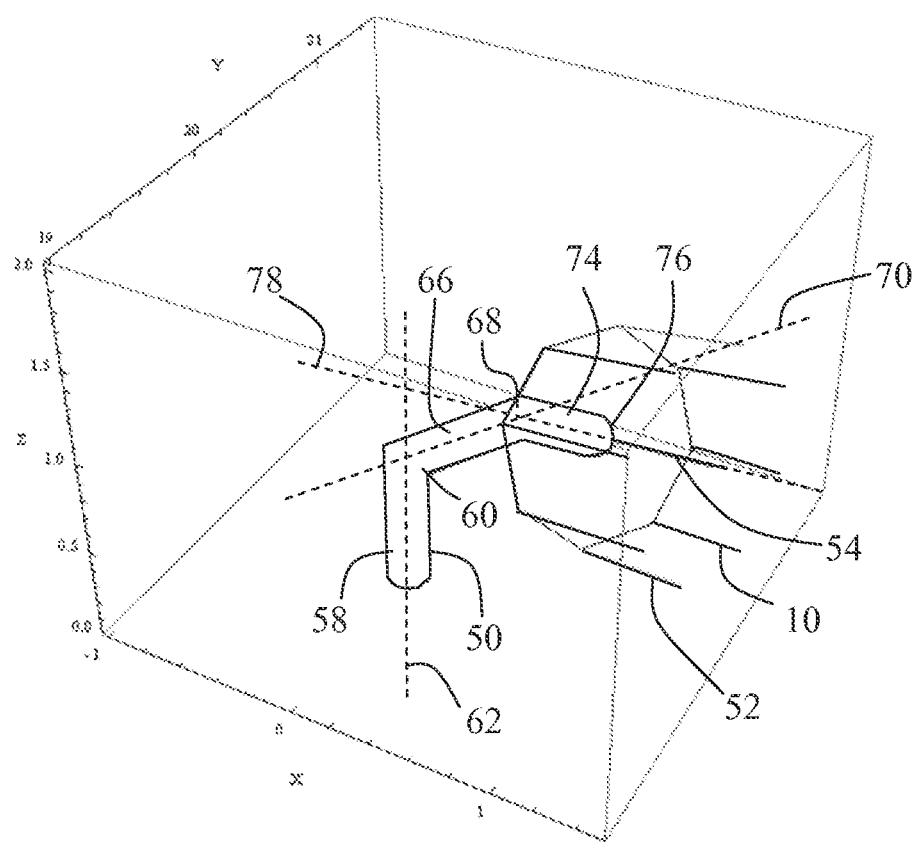
FIG. 3 is a schematic representation of an exemplary mount for adjusting the viewing angle of the pointing system of FIG. 1.

In FIG. 3, the geometry of an exemplary pointing system mount 50 is illustrated. The pointing system 10 is represented by eight periphery viewing lines 52 and a pointing system axis 54. The mount 50 is provided with a gimbal arrangement to provide for adjustment of the viewing direction. Specifically, the mount 50 is fixed to the platform 12 by a first leg 58 that includes a joint 60 rotatable about axis 62 to provide for azimuthal adjustment of the target direction of the pointing system 10. Connected to the joint 60 is a second leg 66 that includes a joint 68 rotatable about axis 70 to provide for elevation adjustment of the target direction of the pointing system 10. Connected to the joint 68 is a third leg 74 including a joint 76 providing for rotation about axis 78 (coincident with the pointing system axis 54) to provide for roll adjustment of the target direction of the pointing system 10.

While the gimbal arrangement of the mount 50 allows for a large range of target directions of the pointing system 10, it may limit slewing the pointing system 10 in two ways. First, each joint 60, 68, and 76 may be limited in range of rotation. For example, in an embodiment, each joint 60, 68, and 76 may only rotate a selected range, such as +/−225 degrees. Therefore, during use a joint 60, 68, or 76 may come to the end of its range of rotation. Second, each joint 60, 68, and 76 may be limited in its rate of rotation to a selected maximum rate, such as to about one degree per second. As a result, a pointing system may not be able to hold a view of a target because it is unable to slew quickly enough to keep the target in view. Both the limitations to range of rotation and limitation of slewing rate can limit stare-time of a target by a pointing system.

Also, the structure of the pointing system 10 itself may block portions of the celestial sky from view. Specifically, the pointing system 10 cannot look down its base. Therefore, the viewing range of the pointing system 10 is limited to a maximum angle, such as no more than 100 degrees from the pointing system zenith vector. The pointing system zenith axis begins at the center of the Earth and passes through the telescope's vertical axis.

The gimbal arrangement of the mount 50 in FIG. 3 is commonly known as azimuth/elevation (AZ/EL). While an AZ/EL telescope geometry is illustrated, the method and system described herein may be used to evaluate pointing systems having any telescope geometry, including for example, FORK, GEM, and AZ/EL Compact.

As is understood from the above, the view of a pointing system 10 is limited by a plurality of potential occultations such as by celestial bodies 14, 16, and 18; structural elements 38 and 42, and the pointing system 10 itself. Furthermore, movement of the pointing system 10 may be limited both in range and in angular velocity during skewing. Therefore, determination of "stare-time" by a pointing system 10 of a selected target, i.e., how long the pointing system 10 can obtain an uninterrupted view of the selected target, requires the consideration of a number of changing factors.

Figure 4:
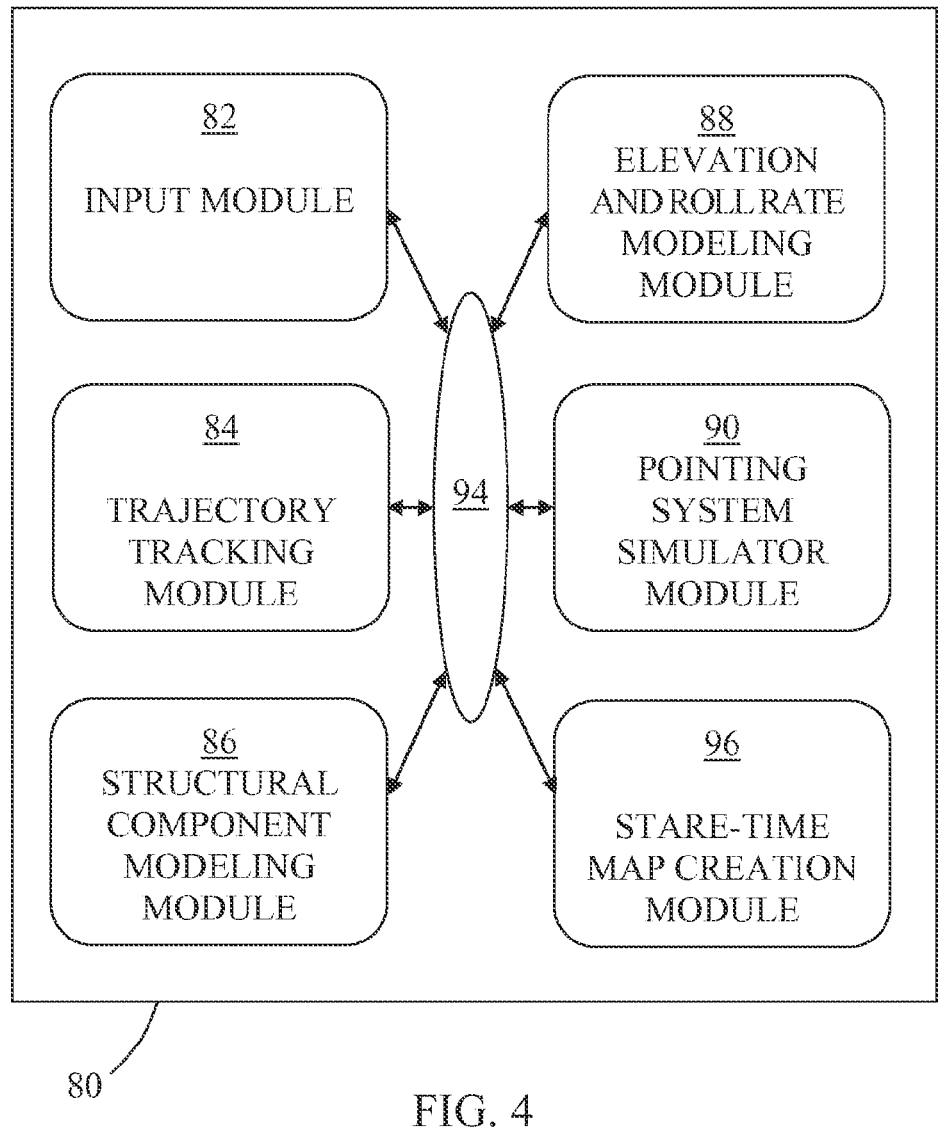
FIG. 4 is a schematic representation of an exemplary system for evaluating stare-time by a pointing system.

In order to evaluate stare-time of an existing pointing system 10 or of a proposed pointing system 10 with a proposed geometry at a proposed location, the system 80 of FIG. 4 is provided. The system 80 may comprise a processor and includes an input module 82 for receiving inputted data or preferences as discussed below. Further, the system 80 includes a processor module 84 for simulating trajectory tracking for the Earth 14, the Moon 16, the Sun 18, and the platform 12. Processor module 86 models potentially obstructing structural components of the platform 12 which and can contribute to the obstruction of a particular direction of view. In particular, the movements of the movable structural elements 42 as they follow the Sun are modeled to determine when they cause an obstruction that blocks a viewing direction. In addition, the basic truss 38 is considered an impediment to viewing when it blocks a viewing direction. Also, in recognition of the practical limitations of smooth operation of the proposed telescope's tracking hardware, maximum azimuth, processor module 88 models the limitation of elevation and roll rates which, if violated, constitute another viewing obstruction. Only if a viewing direction is not obstructed by any of the items is it considered "unobstructed" at a given moment in time. Processor module 90 may simulate pointing the pointing system at a selected target, or at all selected targets in view of the other simulations.

In an embodiment, the system 80 treats each potentially obstructing element uniquely. For example, the system 80 prohibits the simulated pointing system 10 from: pointing anywhere that would bring it within a selected range of the Sun, such as within about 50 degrees of the vector to the center of the Sun; pointing anywhere that would bring it within a selected range of the Moon, such as within 9 degrees of the vector to the center of the Moon; pointing anywhere that would bring it within a selected range of the Earth, such as less than 8 degrees beyond the tangent from the pointing system 10 to the Earth. (the extra 8 degrees avoids looking through the atmosphere of the Earth); slewing to directions that are more than a selected range of the zenith vector, such as more than 100 degrees off the zenith vector, in order to avoid trying to look "down" through its base. In the simulation, the system 80 views the pointing system 10 as an infinitely long 1 meter octagonal prism (as a convenient approximation to a cylinder) which is projected out from its base and checked for intersection with various of the platform components, including the Sun-tracking solar array wings and radiators, and to the, relative to the pointing system, unmoving truss.

The system and method contemplate the use of various coordinate systems. Often, the three coordinate systems of interest are the heliocentric ecliptic, the geocentric equatorial, and the platform (Space Station) following. The heliocentric ecliptic frame has the Sun at the origin, the +X axis pointed to by the autumnal equinox, and the +Z axis pointing "up" to create a right-handed coordinate system. The XY plane—the "ecliptic"—is defined by the orbital plane of the Earth around the Sun." This is the primary coordinate system in which the positions of the Sun, Moon, Earth, and platform are tracked within the simulation. The origin of this coordinate system is taken to be unmoving. Looking out from a point at the center of the Sun, one can reference direction vectors in terms of ecliptic longitude (varying from 0 to 360 degrees with zero degrees being along the +X axis) and ecliptic latitude (with +90 degrees occurring along the +Z axis, −90 degrees occurring along the −Z axis, and 0 degrees occurring within the plane of the ecliptic itself). This system is sometimes referred to as the Heliocentric Aries Ecliptic because it's +X axis is aligned with the First Point of Aries.

The geocentric equatorial coordinate system has its origin at the center of the Earth, its Z axis along the spin axis of the planet, its +X axis pointing to the Line of Aries, and its +Y axis completing the right-handed coordinate system. The geocentric equatorial coordinate system is rotated 23.5 degrees from the plane of the ecliptic, reflecting the tilt (obliquity) of the spin axis of the Earth.

The platform (Space Station) coordinate system used is an inverted LVLH (anti-nadir) system in which the +X axis points along the velocity vector, the +Z axis points to the zenith (away from the center of the Earth), and the +Y axis completes the right-handed coordinate system. This system rotates as the vehicle orbits the Earth, taking approximately 92 minutes to complete one orbit. A proposed telescope affixed to the platform must therefore be issued slewing commands in this frame of reference.

For a simulation in a heliocentric ecliptic coordinate system the Sun is taken as unmoving and is always located at coordinates {0,0,0}. The Moon orbits the Earth, and the Moon's position can be calculated according to known algorithms. For example, a fast algorithm for calculating Moon position is provided by "AN ALTERNATIVE LUNAR EPHEMERIS MODEL FOR ON-BOARD FLIGHT SOFTWARE USE" by David G Simpson, NASA Goddard Space Flight Center, May 1999, 1999 Flight Mechanics Symposium; 175-184; (NASA/CP-1999-209235). This series expansion provides a fast method of computing Moon position in geocentric equatorial coordinates given a date offset. A simple rotation and translation to the heliocentric equatorial frame completes the determination of Moon position. In an embodiment in which the platform is the International Space Station, the orbit and position of the Space Station is computed using the 6 fundamental orbital parameters plus perturbance features to accommodate orbital plane precession due to the equatorial bulge of the Earth. The calculation is based on a reference set of published orbital parameters at a known time, which are then advanced or pushed back in time to the desired start time of the simulation.

Because the solar arrays on the platform move as they track the Sun, the system 80 computes continuously changing alpha and beta gimbal angles such that the normal to the solar arrays always points to the Sun. Thus, their "shadows" may move across the field of view of the pointing system as it moves, causing obstructions.

The system 80 simulates the telescope track all viewing directions in the celestial sky, ranging through ecliptic longitude 0 to 360 and ecliptic latitude +90 to −90. At each step of its orbit (which may be simulated at 92 one-minute intervals for an embodiment using the Space Station), the pointing system is (in simulation) pointed at every patch of celestial sky, and the occluding elements noted. The occluding elements are obscuring bodies (Earth, Moon, Sun, fixed and movable Space Station components) and excessive slew rates (for example, the maximum slew rates may be limited to 1 degree per second in telescope azimuth, elevation, and roll).

At the end of a one-orbit simulation, for each possible viewing direction in the sky, the processor 94 of system 10 compiles a list of intervals in which the view is occluded and non-occluded. For example, for one-minute intervals for a 92 minute orbit, there is an observation list of 92 occluded or non-occluded states for each possible viewing direction. If a view in a direction is occluded by any one occultation, the system 80 considers that view, at that time, in that direction, as occluded. Otherwise, the view is non-occluded, i.e., clear, at that time in that direction.

Using the lists of occluded/non-occluded observations for every viewing direction in the sky, the processor 94 of system 80 obtains the longest contiguous (uninterrupted) usable viewing time for that direction. A processor module 96 uses the longest contiguous usable viewing times to create a set of "stare-time maps". Each stare-time map is a sky map that indicates, for each possible viewing direction, whether that direction may be seen clearly by the pointing system of a specific minimum amount of time (such as, for example, 5 minutes). A rectangular sky map is a representation of the visible celestial sphere as seen from the center of the Sun. Rectangular sky maps are shown with ecliptic longitude along the horizontal axis (running from 0 to 360 degrees) and ecliptic latitude along the vertical axis. Polar sky maps are "equal area" projections. Such polar sky maps have the advantage that each patch of sky shown on the map represents the same amount of sky area, unlike rectangular sky maps that tend to exaggerate the size of the extreme northern and southern sections of the display—a shortcoming common to all Mercator-like projections.

Sets of rectangular, polar or other stare-time maps can be produced for any desired duration, such as from five-minute intervals (showing how much of the sky is continuously visible for at least 5 minutes) up to 90-minute intervals (showing how much of the sky is continuously visible for at least 90 minutes). Stare-time maps represent the results of the entire simulation run, and are thus most understandable in the context of a simulation run that lasts exactly one orbit. Stare-time maps indicate, over the entire celestial sphere, how much uninterrupted stare-time is available in every direction of the celestial sphere.

Figure 5:
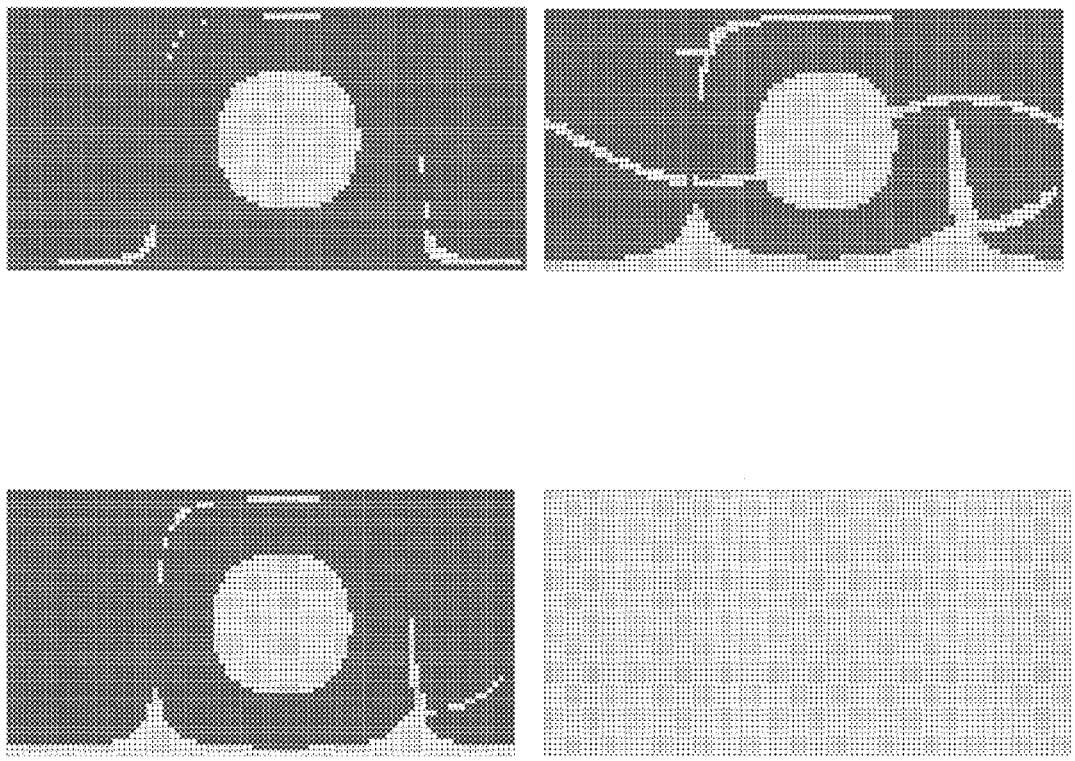
FIG. 5 is a progression of rectangular sky charts showing what selected targets are visible for minimum durations of stare-time.
Figure 6:
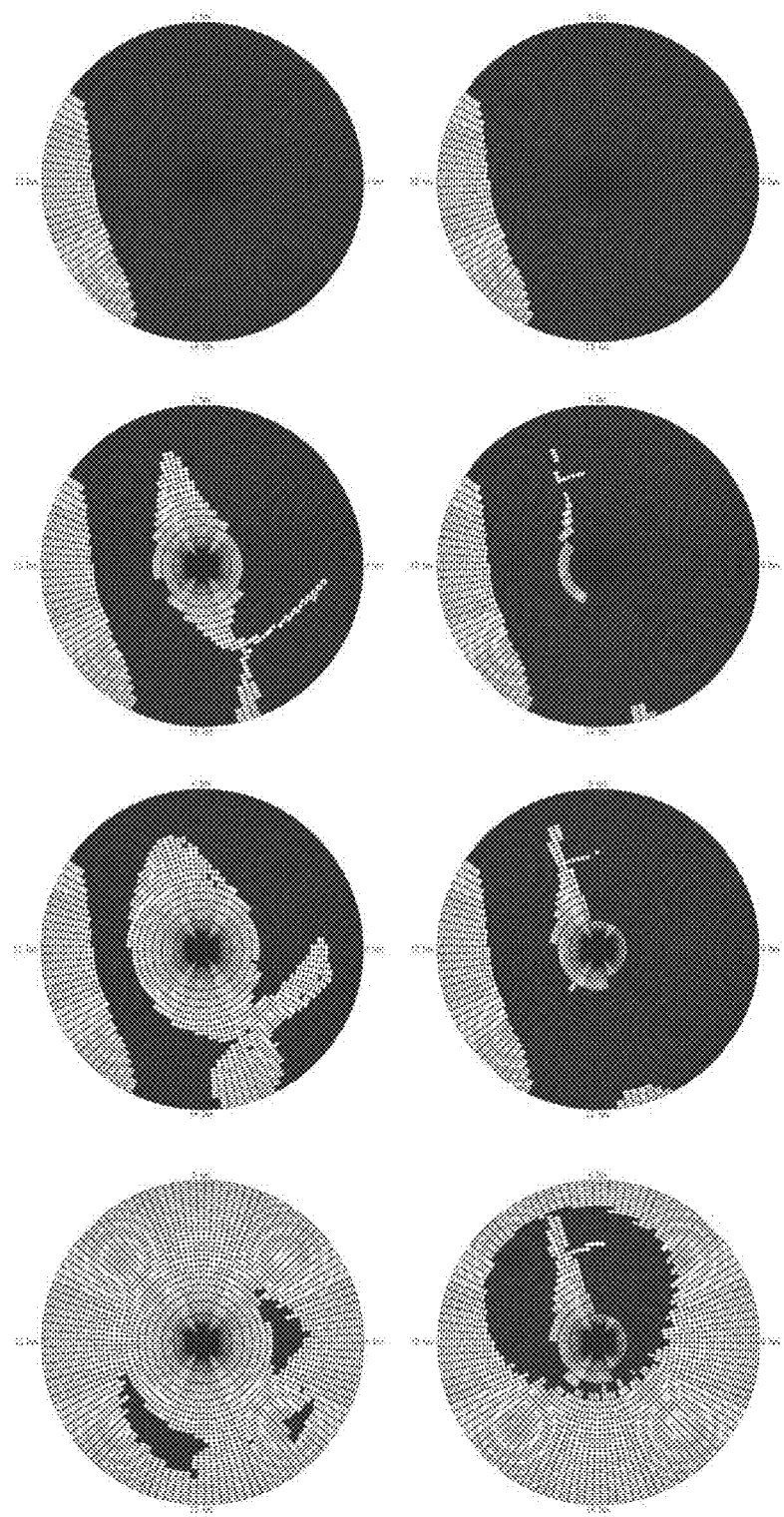
FIG. 6 is a progression of polar sky charts showing what selected targets are visible for minimum durations of stare-time

FIGS. 5 and 6 illustrate series of stare-time maps, rectangular and polar, respectively. For each series, as interval periods are increased, the sky maps transition from an almost completely visible sky map (because every selected target is visible for short durations of most orbits) to a completely obscured sky map (almost no selected target is completely visible for 60 or more minutes of each orbit due to celestial body and other shadowing).

For each map of the series in FIG. 5, each small rectangle—each patch of the celestial sky individually examined—represents a 4 degree by 4 degree patch (4 degrees ecliptic longitude by 4 degrees ecliptic latitude). Shading indicates that the patch of the celestial sky is viewable for the required duration during the specified time period. Patches of the sky that are unshaded are not viewable by the pointing system for the required stare-time duration during the specified time period.

In FIG. 5, the upper left stare-time map illustrates a required 5-minute stare-time duration, and it shows that most of the celestial sky is viewable by the pointing system for at least 5 minutes. The upper right stare-time map illustrates a required 20-minute stare-time duration. The lower left stare-time map illustrates a required 35-minute stare-time duration, and the lower right stare-time map illustrates a required 50-minute stare-time duration. As shown, the amount of celestial sky viewable by the pointing system for the required stare-time decreases as the required duration of stare-time increases, until no part of the celestial sky is viewable by the pointing system for this particular embodiment for a 50-minute stare-time duration.

For each map of the series in FIG. 6, side-by-side northern and southern hemisphere views are provided. Further, for each view, the celestial sky is divided into equal area units. Shading indicates that the unit of the celestial sky is viewable for the required duration during the specified time period. Units of the sky that are unshaded are not viewable by the pointing system for the required stare-time duration during the specified time period.

In FIG. 6, the top map (including both hemisphere views) illustrates viewable portions of the celestial sky for a required 15-minute stare-time duration. The second map illustrates a 30-minute stare-time duration. The third map illustrates a 45-minute stare-time duration, and the fourth map illustrates a 55-minute stare-time duration. Again, as the required duration of stare-time increases, the amount of celestial sky viewable by the pointing system decreases.

In addition to stare-time maps, occlusion maps may also be fabricated. Occlusion maps are averages, taken over the entire duration of the simulation, showing the occlusions contributed by each of the potentially occluding factors: the Sun, the Earth, the Moon, the "horizon", the platform components, and the maximum allowable rotational rates. As averages, these plots are comparable to one another and useful in that relative way, but are less useful in an absolute sense because of their averaging nature. For more absolute results, the stare-time maps are generally most helpful.

Referring back to FIG. 4, it is noted that the simulations can be modified through selected conditions inputted in module 82 as desired. As a result, modification of the simulation is achieved by changing the source code through module 82. The following parameters are available for modification (and may be printed as each simulation is run): the duration of simulated interval; the "step" time of the simulation, expressed in seconds (integration occurs on this interval); the platform for evaluation, for example, the Space Station or other satellites; the telescope geometry, such as AZ/EL Mount, GEM Mount, Fork Mount, AZ/EL Compact Mount; the coordinate system desired; the width (expressed as degrees of longitude) of a swatch of sky that is analyzed as a single point and considered to represent a single viewing direction; the height (expressed as degrees of latitude) of a swatch of sky that is analyzed as a single point and considered to represent a single viewing direction; the threshold angle for angular displacement between the vector from the pointing system to the Moon and the vector from the telescope in the simulated viewing direction; the threshold angle for angular displacement between the vector from the telescope to the Sun and the vector from the telescope in the simulated viewing direction; the threshold angle for angular displacement between the vector from the telescope to the Earth and the vector from the telescope in the simulated viewing direction; the platform horizon occulting angle in degrees off zenith; the starting date and time of the simulation; the number of complete orbits simulated (including fractional numbers); maximum rates of movement of the pointing system about its three axes; whether the Earth moves about the Sun during the simulation; whether intersections with platform components are computed; whether the configuration parameters are printed to output; whether certain environmental parameters are printed to output; whether contour map plots of the maximum rotational rates are printed to output; whether a series of basic platform position and velocity plots are printed to output; whether a series of representative plots of rotational rates are printed to output; whether a series of orbital parameter plots for the platform orbit are printed to output; whether a series of stare-time maps are generated; whether occlusion maps are generated and printed to output; whether the underlying numerical value arrays which drive the stare-time maps are printed to output; whether detailed occlusion history maps are printed to output; whether the sky maps are generated in a rectangular Mercator-projection-like map in which longitudes from 0 to 360 are label the horizontal axis, and latitudes from −90 to +90 label the vertical axis, and/or in alternative "circular" maps, of which there are two per rectangular map (one for the northern hemisphere and one for the southern hemisphere), and are "equal area" maps presented as multiring pie charts; whether circular charts are printed to output; whether precession due to the orbital perturbation caused by the Earth's equatorial bulge is inhibited and the platform orbit repeats itself; whether the entire notebook self-exports into a PDF file; whether occlusion history data is written to a file for later use by subsequent application programs; whether occlusion totality data is written to a file for later use by subsequent application programs; whether occlusion history data is written to a file for later use by subsequent application programs; whether "unique" occlusion (i.e., an occlusion that is not otherwise blocked by any possible occluding body such as the Sun, Earth, Moon, or maximum rotational rates) history data is written to a file for later use by subsequent application programs.

As a result of the simulation and modeling capabilities of the system 80, stare-times of both proposed and existing pointing systems may be evaluated in light of the simulated movement of celestial bodies, simulated movement of the pointing system platform, simulated movement of components on the platform tracking the Sun, and simulating slewing of the pointing system including range-of-motion and angular velocity limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for evaluating performance of a pointing system mounted on a platform comprising:
   specifying a time period for evaluation;
   simulating movement of selected celestial bodies during the time period with a processor;
   simulating movement of the platform on a non-orbiting path during the time period with the processor;
   simulating pointing the pointing system in each celestial direction during the time period with the processor;
   calculating stare-time in each celestial direction uninterrupted by the selected celestial bodies and the platform during the time period with the processor; and
   controlling pointing of the pointing system with a control device based on the stare-time calculated with the processor.

2. The method of claim 1 wherein, for each celestial direction, simulating pointing the pointing system comprises:
   simulating slewing the pointing system; and
   limiting the rate of slewing of the pointing system based on a gimbaling geometry of the pointing system.

3. The method of claim 1 wherein, for each celestial direction, simulating pointing the pointing system comprises:
   simulating slewing the pointing system; and
   limiting the rate of slewing of the pointing system to a maximum rate in azimuth, elevation and roll.

4. The method of claim 1 wherein calculating stare-time in each celestial direction during the time period comprises identifying occultations in each celestial direction by each selected celestial body and by the platform.

5. The method of claim 1 further comprising scheduling image recording of selected targets by the pointing system based on the calculated stare-times of the selected targets.

6. The method of claim 1 further comprising mapping the stare-time of the pointing system for each selected target.

7. A method for evaluating stare-time by a pointing system during specified time periods comprising:
   simulating movement of the pointing system and celestial bodies during the specified time periods with a processor;
   simulating pointing the pointing system at each region of the celestial sky with the processor;
   identifying occultations between the pointing system and each region of the celestial sky during each specified time period by the celestial bodies with the processor; and
   producing a stare-time map illustrating an occluded view or non-occluded view for each region of the celestial sky for the specified time periods with the processor.

8. The method of claim 7 wherein the pointing system is mounted on a platform, and wherein simulating movement of the pointing system comprises simulating movement of the platform on a non-orbiting path.

9. The method of claim 8 wherein the platform comprises a structure, and wherein the method further comprises:
   simulating the position of the structure relative to the pointing system during movement of the platform; and
   identifying occultations between the pointing system and each region of the celestial sky by the structure of the platform.

10. The method of claim 8 wherein simulating movement of the pointing system and celestial bodies during the specified time period comprises simulating movement of the Sun during the specified time period, wherein the platform comprises a movable component configured to move to track the Sun, and wherein the method comprises:
    simulating movement of the movable component based on the simulated movement of the platform;
    simulating the position of the movable component relative to the pointing system during movement of the platform and movable component; and
    identifying occultations between the pointing system and each region of the celestial sky by the movable component of the platform.

11. The method of claim 7 wherein simulating pointing the pointing system at each region of the celestial sky comprises:
    simulating slewing the pointing system; and
    limiting the rate of slewing of the pointing system.

12. The method of claim 7 wherein simulating pointing the pointing system at each region of the celestial sky comprises:
    simulating slewing the pointing system; and
    limiting the rate of slewing of the pointing system to a maximum rate in azimuth, elevation and roll.

13. The method of claim 7 wherein simulating pointing the pointing system at each region of the celestial sky comprises:

simulating gimbal movements of the pointing system; and limiting the range of gimbal movements of the pointing system based on a gimbaling geometry of the pointing system.

14. The method of claim 7 wherein the pointing system has a zenith vector, and wherein identifying occultations between the pointing system and each region of the celestial sky comprises identifying an occultation by the pointing system when simulating pointing the pointing system more than a selected minimum angle from the pointing system zenith vector.

15. The method of claim 7 further comprising controlling pointing of the pointing system with a control device based on the stare-time calculated with the processor.

16. The method of claim 7 wherein producing the stare-time map illustrating the occluded view or non-occluded view for each region of the celestial sky for the specified time periods with the processor comprises producing rectangular sky maps or polar sky maps.

17. The method of claim 7 further comprising fabricating an occlusion map displaying occultations contributed by a selected celestial body with the processor.

18. The method of claim 7 further comprising fabricating occlusion maps displaying occultations contributed by each celestial body with the processor.

19. The method of claim 7 wherein:
    simulating pointing the pointing system at each region of the celestial sky comprises simulating slewing the pointing system and limiting the rate of slewing of the pointing system to a maximum rate in azimuth, elevation and roll and/or simulating gimbal movements of the pointing system and limiting the range of gimbal movements of the pointing system based on a gimbaling geometry of the pointing system;
    identifying occultations comprises identifying occultations caused by the rate of slewing and/or the range of gimbaling movements;
    producing the stare-time map comprises evaluating the occultations to determine whether a view of each region of the celestial sky is occluded or non-occluded.

20. A system for evaluating stare-time by a pointing system during a specified time period comprising:
    a module for simulating movement of the pointing system, the Moon, and the Earth during the specified time period;
    a module for simulating pointing the pointing system at the selected target;
    a module for identifying occultations between the pointing system and the selected target by the Sun, the Moon, or the Earth;
    a processor for producing a stare-time map illustrating an occluded view or non-occluded view for each region of the celestial sky by the pointing system; and
    a control device for controlling pointing of the pointing system based on the stare-time map.

* * * * *